United States Patent [19]
Bladie et al.

[11] Patent Number: 5,832,825
[45] Date of Patent: Nov. 10, 1998

[54] SAFETY DEVICE IN A ZONE FOR INFEEDING A WEB OF MATERIAL INTO A FOLDER

[75] Inventors: Gerard Bladie, Cires les Mello; Pascal Jaulin, Villers sous Saint Leu; Henry Hervé, Creil, all of France

[73] Assignees: Hiedelberger Druckmaschinen AG, Heidelberg, Germany; Heidelberg Harris, S.A., Montataire Cedex, France

[21] Appl. No.: 821,036

[22] Filed: Mar. 20, 1997

[30] Foreign Application Priority Data

Mar. 20, 1996 [FR] France ................... 96 03443

[51] Int. Cl.⁶ ........................................ B41F 5/04
[52] U.S. Cl. ...................... 101/219; 493/405; 192/133
[58] Field of Search ................... 101/212, 216, 101/219, 226; 192/130, 131 R, 131 H, 133; 493/405

[56] References Cited

U.S. PATENT DOCUMENTS

| | | | |
|---|---|---|---|
| 1,883,258 | 10/1932 | Wood | 101/216 |
| 3,498,217 | 3/1970 | Kletti | 101/216 |
| 4,214,745 | 7/1980 | Morgret | 271/272 |
| 4,295,421 | 10/1981 | Abendroth et al. | 101/216 |
| 4,669,380 | 6/1987 | Seib et al. | 101/216 |
| 4,765,240 | 8/1988 | Kraus et al. | 101/216 |
| 5,012,912 | 5/1991 | Sanderson et al. | 192/133 |
| 5,241,903 | 9/1993 | Lampic | 101/216 |
| 5,259,313 | 11/1993 | Gibson et al. | 101/425 |
| 5,373,787 | 12/1994 | Junghans et al. | 101/216 |

FOREIGN PATENT DOCUMENTS

| | | |
|---|---|---|
| 2 046 175 | 11/1980 | United Kingdom . |
| 2 188 391 | 9/1987 | United Kingdom . |

*Primary Examiner*—Eugene H. Eickholt
*Attorney, Agent, or Firm*—Herbert L. Lerner; Laurence A. Greenberg

[57] ABSTRACT

Safety device for an infeed site of a web of material into a roller nip in a processing device on a printing press includes cover elements movably mounted on the processing device for nearly completely covering the infeed rollers in operating positions of the processing device.

17 Claims, 6 Drawing Sheets

SAFETY DEVICE IN A ZONE FOR INFEEDING A WEB OF MATERIAL INTO A FOLDER

BACKGROUND OF THE INVENTION

Field of the Invention

The invention relates to a safety device in a zone for infeeding a web of material into a folder, in particular, above rollers for infeeding the web into the folder.

German Patent 15 61 070 discloses a safety device on counter-rotating cylinders particularly on printing presses with a respective protective tube assigned to each of the cylinders at a close spaced distance from the surface thereof. The protective tube is swivellable on swivel levers against spring force about a swivel shaft situated at the height of the cylinder nip in front of the danger zone. The swivel levers are formed as fork levers wherein the protective tubes are rotatably supported so as to be displaceable against spring force in a direction towards the swivel shaft.

Due to great space requirements, the safety device cannot be disposed above an infeed zone of a folder.

German Patent 29 14 152 discloses a safety device on sheet-fed rotary printing presses for safeguarding a roller nip, in particular, between an impression cylinder and a rubber-covered blanket cylinder. Plates cooperating with limit switches are provided for safeguarding and sheet guiding, the plates, when actuated, shutting down the printing press and electrically locking it so that only inching-mode operation is possible. Two plates are mutually connected articulatedly through the intermediary of a hinge, a first one of the plates being in contact with a limit switch through the intermediary of a two-armed lever. An operating pin attached to the first plate actuates the two-armed lever, as a result of which the limit switch is brought into operating position.

The published German Patent Document DE 43 15 224 A1 discloses a protective device for the infeed location of a web of material at a roller nip. This approach relates to shielding against external intervention a roller nip into which a web of material is drawn. An objective thereof, when rollers of different diameter which are supported on a sliding carriage are used, is to facilitate the adaptation or matching of corresponding protective devices thereto. This is achieved by a protective plate which is moved together with and as a function of the contacting movement of the sliding carriage and is displaceable radially with respect to the roller in adapting to the outside diameter thereof. In this arrangement, a large range of diameters of exchangeable rollers is automatically covered with a single protective plate.

In the course of mounting demands with respect to industrial safety imposed by national supervisory authorities, such as the employers' liability insurance associations in Germany, increasingly tougher demands are being made upon the operational safety of plants and machinery, such as web-fed rotary printing presses. The demands relate to operator safety when the machine is running, as well as for setting-up work on the machines, such as changeovers to other printing jobs or to other printing substrates, or the like. It has become apparent that special care or caution is required as the web is being fed into the folder.

SUMMARY OF THE INVENTION

Proceeding from the outlined state of the prior art, it is an object of the invention of the instant application, taking into account every possible operating position of a first longitudinal or former fold device, to safeguard the infeed-roller nip at all times.

With the foregoing and other objects in view, there is provided, in accordance with the invention, a safety device for an infeed site of a web of material into a roller nip in a processing device on a printing press, comprising cover elements movably mounted on the processing device for nearly completely covering the infeed rollers in operating positions of the processing device.

In accordance with more specific features of the safety device, the processing device is a movable first longitudinal-folding device of a folder, and the cover elements are movably mounted on the first longitudinal-folding device for nearly completely covering the infeed rollers in the operating positions of the first longitudinal-folding device.

In accordance with another feature of the invention, the safety device includes stationary cover elements with which the movably mounted cover elements on the first longitudinal-folding device are cooperatable.

In accordance a further feature of the invention, the first longitudinal-folding device includes a former plate guidable in a telescopic cover.

In accordance with an added feature of the invention, the telescopic cover has a substantially triangular cross section.

In accordance with an additional feature of the invention, the telescopic cover has a stationary part and a movable part.

In accordance with yet another feature of the invention, the safety device includes deflector members disposed adjacent to the telescopic cover.

In accordance with yet a further feature of the invention, the deflector members are disposed above the infeed rollers.

In accordance with yet an added feature of the invention, the deflector members form a funnel-shaped infeed zone.

In accordance with yet an additional feature of the invention, the first longitudinal-folding device is mounted on a movable former support.

In accordance with still another feature of the invention, the displaceable elements are attached to the former support and are displaceable on guides.

In accordance with still a further feature of the invention, the safety device includes a covering element mounted on the displaceable elements and overlapping a front end of the first longitudinal-folding device.

In accordance with still an added feature of the invention, the safety device includes a side wall having a stationary cover disposed thereon, the overlapping cover element telescopically overlapping the stationary cover disposed on the side wall.

In accordance with still an additional feature of the invention, the safety device includes a guide adjacent the infeed rollers, and a drive for moving the first longitudinal-folding device on the guide relative to the infeed rollers.

In accordance with another feature of the invention, the safety device includes a displaceable cover in front of a former nose movable by the drive through the intermediary of a connecting member.

In accordance with a further feature of the invention, the displaceable cover is constrained to move in accordance with the movement of the first longitudinal-folding device.

In accordance with an added feature of the invention, the connecting member is a belt.

In accordance with an alternative feature of the invention, the connecting member is a chain.

The advantages of the construction according to the invention lie in the virtually complete covering of the infeed zone of a web of material into a folder. Whenever the first longitudinal or former-folding device is readjusted, the safety device undergoes a forced or mandatory repositioning, with the result that operator safety is assured in any operating position of the first longitudinal or former-folding device. No relative adjustment or readjustment of safety devices with respect to the first longitudinal or former-folding device takes place. This is assured automatically, thereby considerably reducing the risk of injury.

The zones above the roller nip between the infeed rollers, both before and also after the former nose or tip, are covered by the device according to the invention. Installed between the side wall of the folder and the former nose or tip is a telescopic cover covering the roller nip between the infeed rollers as a function of the operating position of the first longitudinal or former-folding device. Because the telescopically acting cover is flanked by two deflector members, which are in the form of deflector plates in the illustrated embodiments, there is also no possibility of the operator coming into contact laterally with the infeed roller.

The telescopically acting cover preferably has a substantially triangular cross section, so that an optimum covering of the roller nip is provided. A former support carrying the former plate of the first longitudinal or former-folding device may be displaceable, and the displacement of the first longitudinal or former-folding device on a cross-member or traverse is also possible.

In a different embodiment of the device according to the invention, elements which are displaceable on guides may be disposed on the former, the displaceable elements carrying a cover overlapping a front section of the former nose or tip.

In another different embodiment of the device according to the invention, a displaceable cover may be moved together and in synchronism with the first longitudinal or former-folding device by the actuator drive therefor through the intermediary of a connecting member which is formed as a chain or a cable or the like.

According to a further different embodiment of the device according to the invention, a front part of the displaceable cover is moved, through the intermediary of the former tip, in synchronism with a rear protective element held on two rods.

Other features which are considered as characteristic for the invention are set forth in the appended claims.

Although the invention is illustrated and described herein as embodied in a safety device in a zone for infeeding a web of material into a folder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF PREFERRED EMBODIMENTS

Figure 1:
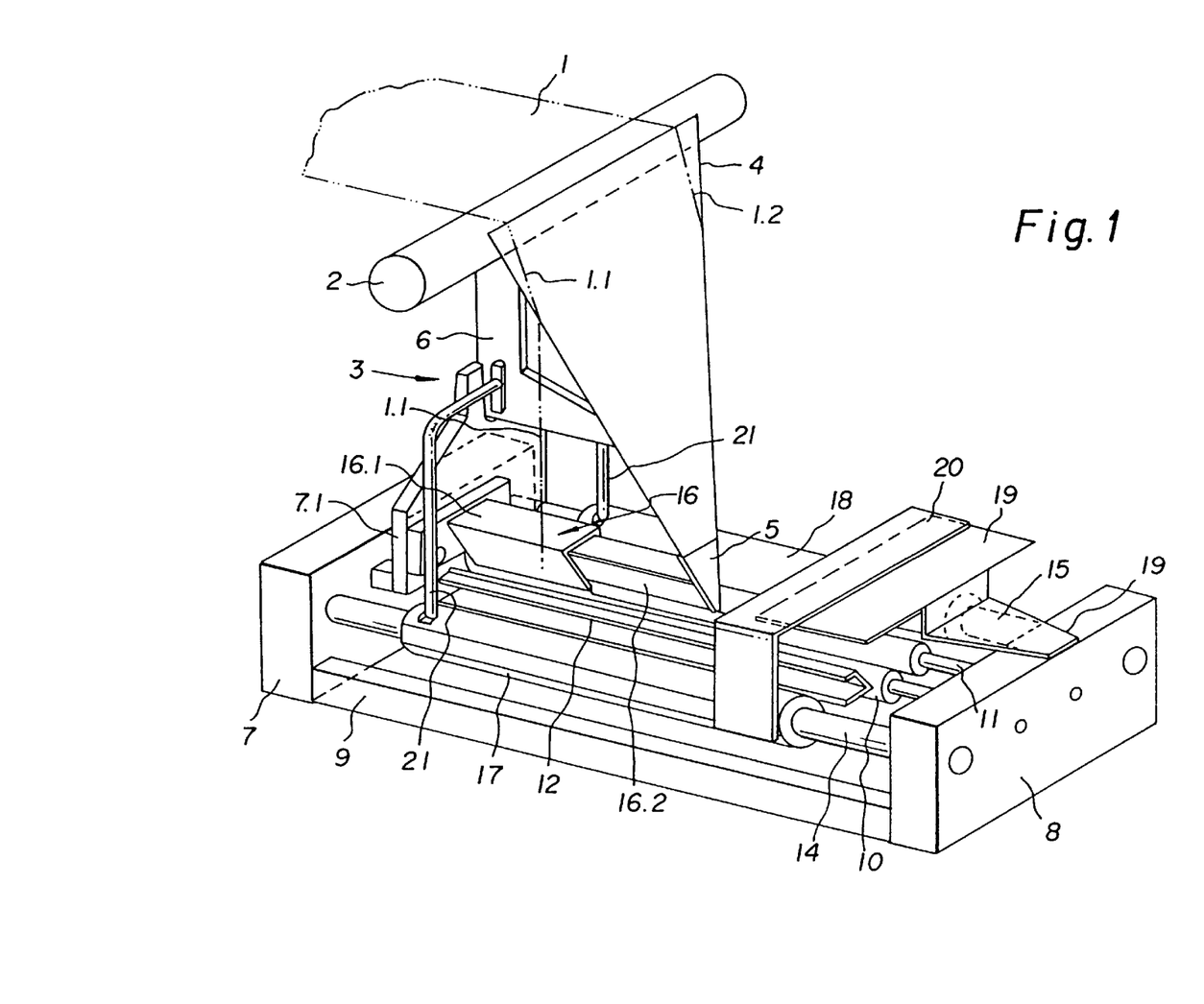
FIG. 1 is a front, left-hand side and top perspective view of a first longitudinal or former folding device above a folder.

Referring now to the drawings and, first, particularly to FIG. 1 thereof, there is shown therein a perspective representation of a first longitudinal or former-folding device 3 disposed above a folder. A web of material 1 travels via an idler roller 2 onto a former plate 4 of the first longitudinal or former-folding device 3, whereat it is longitudinally folded. After the formation of the first longitudinal fold, lateral edges 1.1 and 1.2 of the web of material 1 form the open part of the longitudinally folded web of material 1. The web of material 1 travels over a former nose or tip 5 of the former plate 4 into an infeed nip between two infeed rollers 10 and 11 of the folder.

The former nose or tip 5 of the former plate 4 is connected to a telescopically extensible covering element 16 disposed behind the former nose or tip 5. The telescopic covering element 16 is formed of a stationary part 16.1 flanged onto a side wall 7 by a support 7.1, and a part 16.2 extensible therefrom or retractable thereinto, the part 16.2 being connected to the former nose or tip 5. Both covering-element parts 16.1 and 16.2 preferably have a triangular cross section, due to which they project at lower ends thereof into the nip between the infeed rollers 10 and 11. Besides a triangular cross section, it would also be possible to employ a different cross section, such as trapezoidal cross section, for example, for the covering element 16. Lateral deflector members 12 and 13 (note FIG. 3) are mounted next to the telescopically retractable and extensible covering 16 and serve to prevent an operator from reaching from the side into the roller nip between the infeed rollers 10 and 11. The lateral deflector members 12 and 13 formed in this embodiment as suitably profiled metal sheets or plates can be seen better in FIG. 3.

In the embodiment shown in FIG. 1, two displaceable elements 17 and 18 are attached, respectively, through the intermediary of a connecting rod 21, to a former support 6. In the thus illustrated embodiment, the displaceable elements 17 and 18 are formed as sleeves, enclosing or surrounding respective guides 14 and 15, it being obvious that it would also be possible to employ rollers or the like rolling on rails. A front cover plate 20 is attached to the displaceable elements 17 and 18. Because the cover plate 20 is connected through the intermediary of the displaceable elements 17 and 18 and the connecting rods 21 to the former support 6, a forced joint displacement of the movable cover plate 20 and the former nose or tip 5 occurs. The longitudinal or former-folding device 3 according to the invention consequently permits the front cover 20 to be automatically adjusted together with the former tip 5 by the rod-shaped elements 21 attached to the former support 6. Thus, the zone of the roller nip between the infeed rollers 10 and 11 disposed directly in front of the former nose 5 is covered in any operating position of the first longitudinal or former-folding device 3. Disposed closely below the front movable cover plate 20 is a front stationary cover plate 19 which is bolted to a side wall 8. The front movable cover plate 20, which cooperates with the front stationary cover plate 19, ensures that, at all times, the zone of the roller nip between the infeed rollers 10 and 11 located between the former nose or tip 5 and the side wall 8 is covered.

Figure 2:
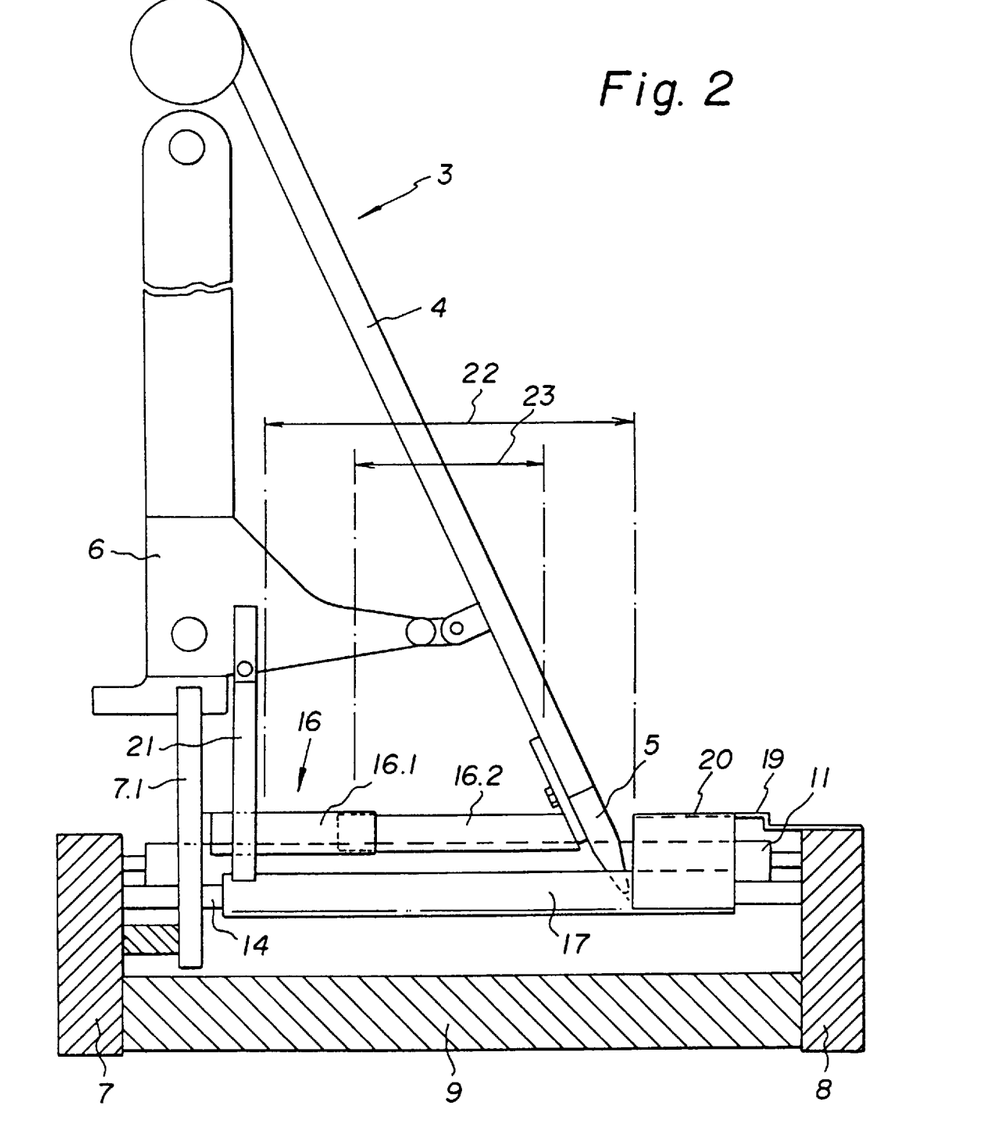
FIG. 2 is an enlarged side elevational view, partly in section, of FIG. 1, showing the first longitudinal-folding device with maximum and minimum processable web formats or sizes.

FIG. 2 is a side elevational view of the first longitudinal or former-folding device with maximally and minimally processable web formats or sizes.

Disposed above a cross-member or traverse 9, which connects the opposite side walls 7 and 8 of the folder, is a support beam 7.1, whereon the rear stationary part 16.1 of the telescopic cover 16 is carried. The rear extensible part 16.2 is connected to the former nose or tip 5 of the former plate 4. Through the intermediary of the connecting rods 21 and the displaceable element 17 shown herein, the front cover plate 20 is connected to the former support 6 and is movable jointly therewith. The maximum size of web which can be processed in the illustrated first longitudinal-folding device 3 is represented by the double-headed arrow 22, the minimum processable web size by the double-headed arrow 23.

Figure 3:
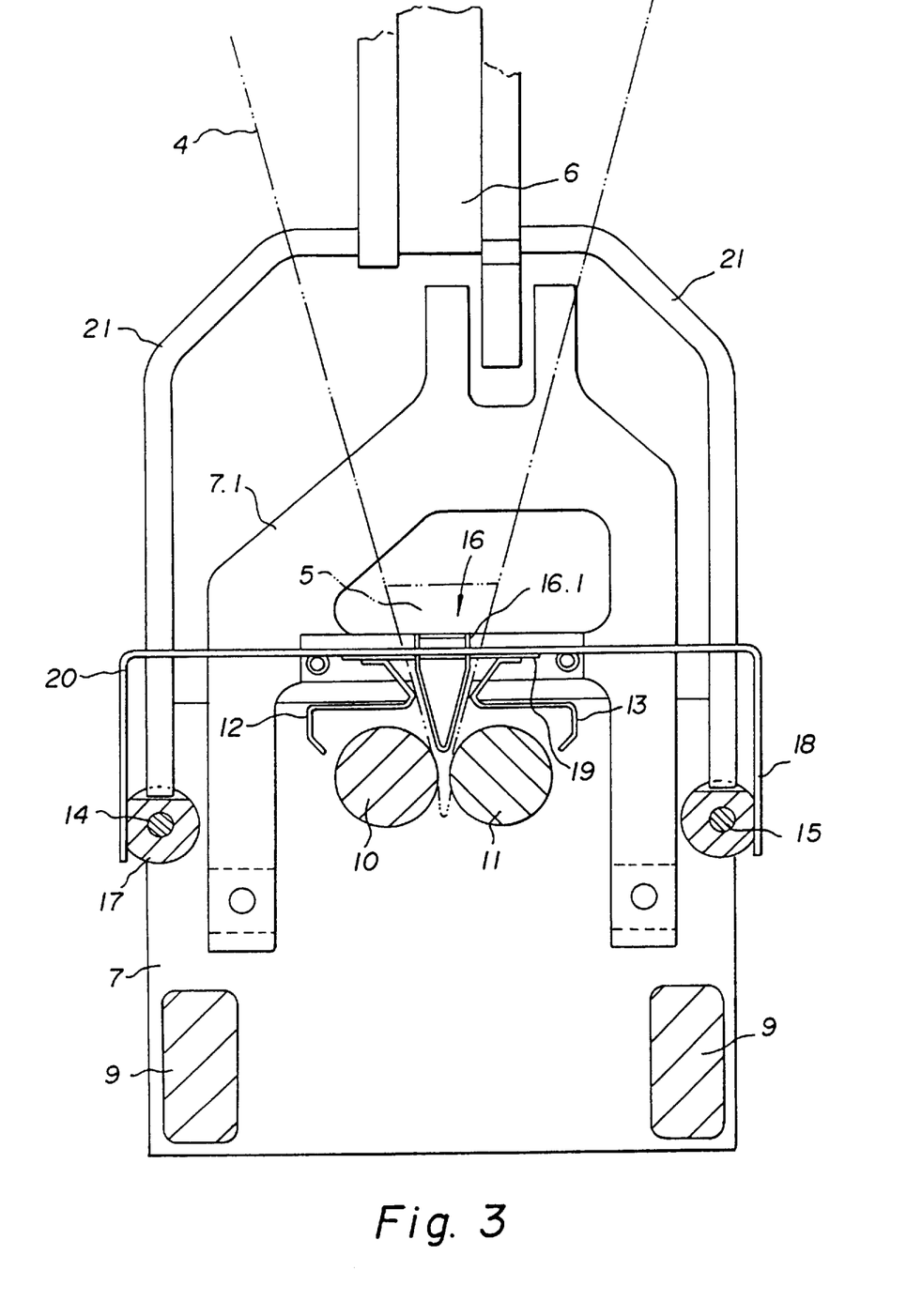
FIG. 3 is an enlarged fragmentary cross-sectional view of FIG. 2 taken along the line III—III in the direction of the arrows and showing the front of the roller zone.

FIG. 3 shows an enlarged detail of the lower region of the former plate 4 and of the infeed zone of the folder. The former nose or tip 5 extends into the roller nip formed between the infeed rollers 10 and 11. Located above the infeed rollers 10 and 11 are the aforementioned deflector members 12 and 13, the shape of which is readily apparent in this view. The deflector members 12 and 13 form therebetween an approximately trapezoidal infeed funnel through which the telescopic cover 16 extends into the roller gap between the infeed rollers 10 and 11. Attached to the former support 6 are the connecting rods 21 which, in turn, are connected to the displaceable elements 17 and 18. The movable cover 20 disposed in front of the former nose or tip 5 is carried on the sleeves 17 and 18, which enclose or surround the guides 14 and 15.

Figure 4:
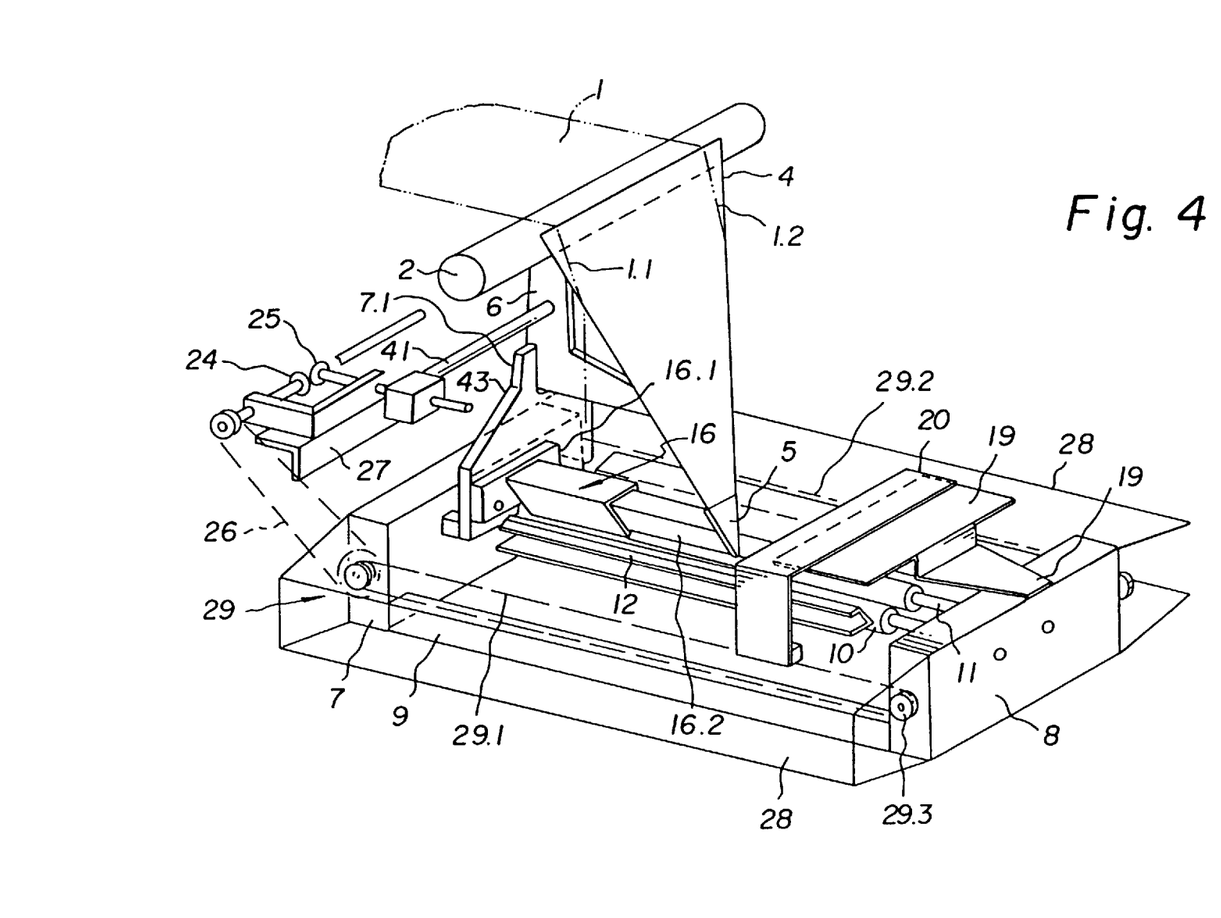
FIG. 4 is a front, left-hand side and top perspective view of a configuration of the first longitudinal-folding device wherein a displaceable cover can be moved by and together with an actuator drive of the longitudinal-folding device.

FIG. 4 is a perspective view of a displaceable first longitudinal or former-folding device wherein a front cover is moved jointly therewith through the intermediary of an actuator drive of the longitudinal or former-folding device. The longitudinal or former-folding device 3 is adjustable through the intermediary of an actuator drive 24 which, however, does not constitute any of the subject matter of the invention of the instant application.

The actuator drive 24 disposed on a support beam 27 drives, on the one hand, a threaded spindle 25 and, on the other hand, a driving device 26 which, in turn, is connected to an arrangement 29 which is described hereinafter. The threaded spindle 25 is mounted on the former support 6 by a rod 41. When the threaded spindle 25 is rotated, the former support 6 of the former plate 4 is able to move translatorily in the direction of the arrow 43. The driving device 26 is formed of a belt, however, it is also conceivable to employ a chain. The arrangement 29 is formed of two belts or two chains 29.1 and 29.2, which are disposed parallel to one another and also parallel to the former plate 4. The belts or chains 29.1 and 29.2 revolve about pulleys or sprocket wheels 29.3, respectively, which are rotatably mounted on the side walls 7 and 8. The two belts or chains 29.1 and 29.2 are attached by the ends thereof to the front cover plate 20, which is disposed in front of the former nose or tip 5. All of the actuating elements are protected by stationary cover elements 28.

The front cover plate 20 can consequently be moved in synchronism with the displacement of the longitudinal or form-folding device 3 without being directly connected to the former plate 4. The front cover plate 20 is moved by the actuator drive 24 of the longitudinal or form-folding device 3.

During the change of position of the former plate 4 of the longitudinal or former-folding device 3, the extensible rear part 16.2 extends out of the stationary part 16.1 of the telescopic cover 16, as a consequence of which the resulting trapezoidal opening always is covered.

Figure 5:
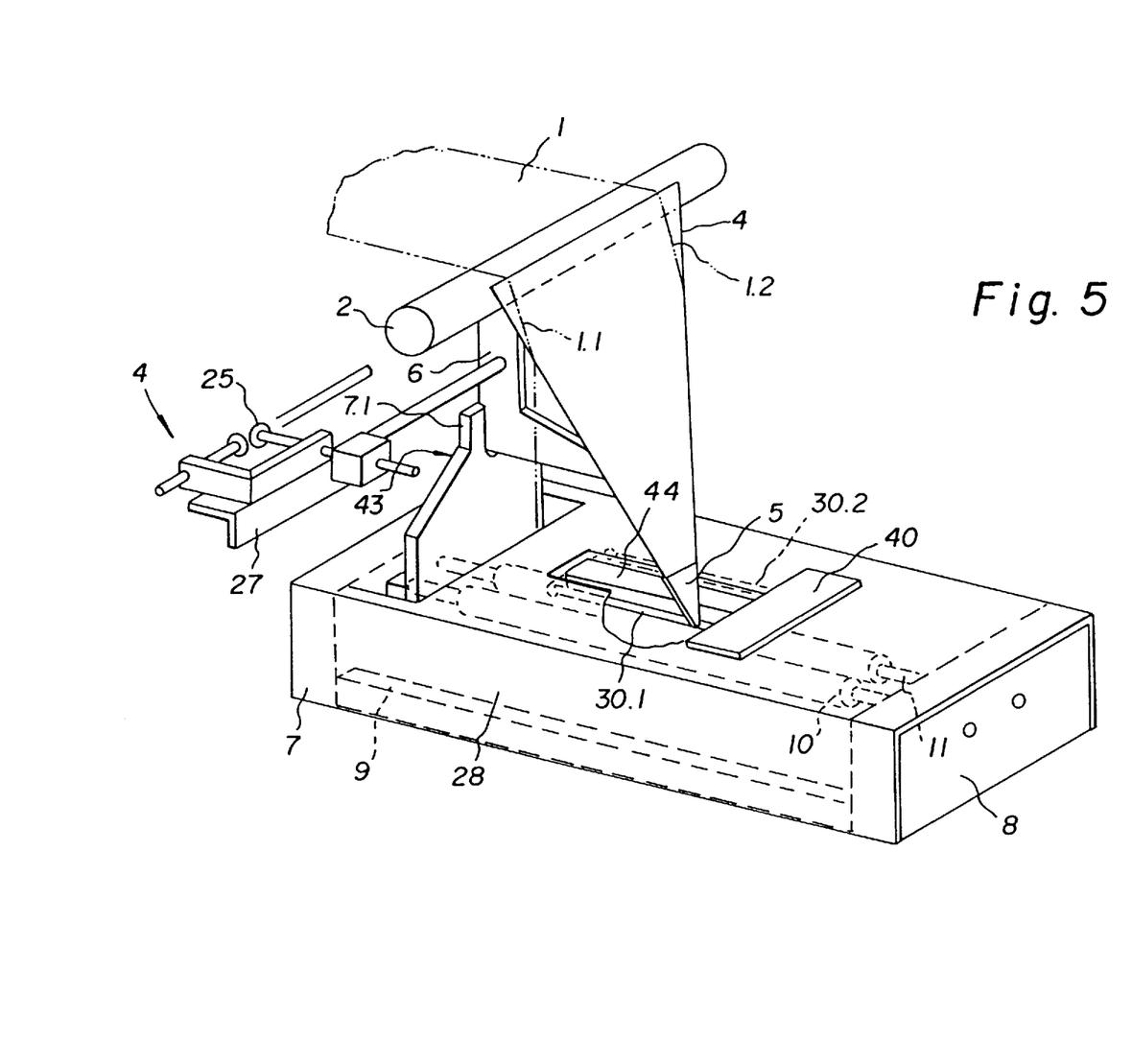
FIG. 5 is a view like that of FIG. 4 of a further embodiment of the invention wherein the displaceable elements are in contact or connected with the fold-former tip.

FIG. 5 is a perspective view of an embodiment of the longitudinal or form-folding device wherein the displaceable covering elements are directly connected to the former nose or tip 5 of the former plate 5.

Figure 6:
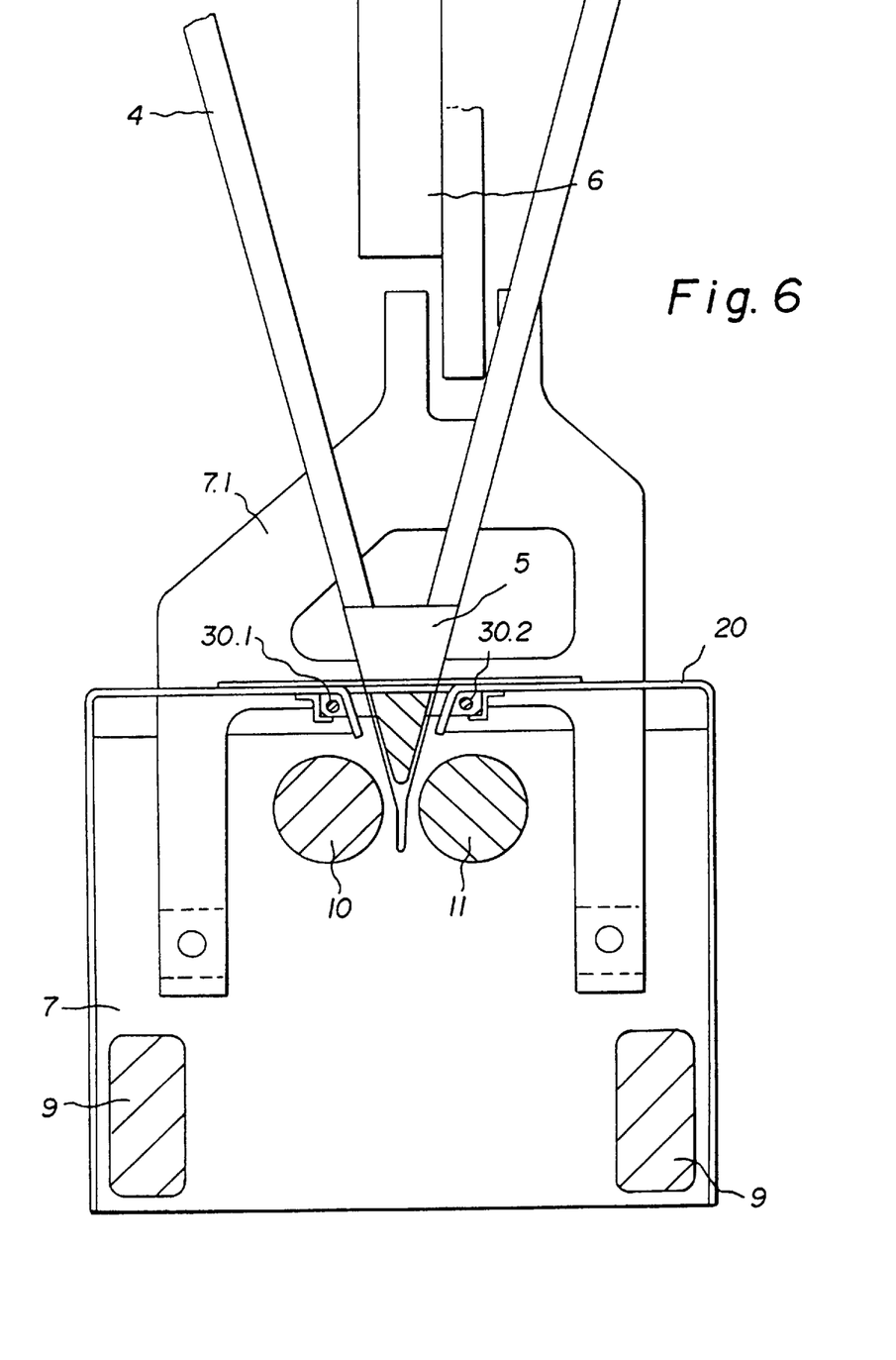
FIG. 6 is an enlarged, fragmentary front elevational view, partly in section, of FIG. 5.

FIG. 6 is a front elevational view of the embodiment shown in FIG. 5.

The two latter figures show an embodiment of the device according to the invention which differs from the embodiments shown in the preceding FIGS. 1 to 4.

FIGS. 1 to 4 show the longitudinal or former-folding device 3 above the infeed rollers 10 and 11 of a folder together with the actuator drive thereof. The infeed rollers 10 and 11 are connected to the side walls 7 and 8 of the housing. In the embodiment shown in FIGS. 5 and 6, the rear mobile cover 16.2 of the telescopic cover 16 is replaced by a rear cover 44. The front cover element 20 has been replaced by a front displaceable cover 40 formed as a plate. The front stationary cover element 19 shown in FIGS. 1 to 4 has been omitted, as also have been the lateral cover elements 12 and 13. The various stationary cover elements 16.1, 19, 12 and 13 of the preceding different embodiments of the device according to the invention have been replaced by one single cover element 28 which protects the infeed zone of the infeed rollers 10 and 11 against any access. FIG. 6 shows the stationary cover element 28 which protects the elements located below the level of the former nose or tip 5 attached to the former plate 4.

The infeed rollers 10 and 11 are effectively protected by the elements enumerated hereinafter, namely, the displaceable cover 40 and the rear displaceable cover element 44 which cooperate with the former nose or tip 5 of the former plate 4 in the manner described hereinafter.

The rear stationary cover element 44 is connected to the former nose or tip 5 of the former plate 4. The special feature is in two rod-shaped elements 30.1 and 30.2, which might also be cords or strings, which extend laterally with respect to the former nose or tip 5 of the former plate 4. Each end of both of the rod-shaped elements is attached, on the one hand, to the front displaceable cover 40 and, on the other hand, to the rear displaceable cover 44, more specifically, next to the sides of the former nose or tip 5 of the former plate 4. The two rod-shaped elements 30.1 and 30.2 can be displaced inside the stationary cover 28. In this manner, due to the actuator drive 24 of the longitudinal-folding apparatus 3, the former plate 4 can be displaced in the direction of the arrow 43. The movement of the former plate 4 causes the displacement of the rear displaceable cover 44 which, in turn, moves the front mobile cover 40 through the intermediary of the two rod-shaped elements 30.1 and 30.2. In this manner, the infeed zone of the infeed rollers 10 and 11 is at all times protected against access from the outside, independently of the instantaneous position of the former plate 4.

We claim:

1. In a printing press having a folder with a movable first longitudinal-folding device acting as a processing device and having infeed rollers defining a roller nip, a safety device for an infeed site of a web of material into the roller nip, the safety device comprising:

cover elements movably mounted on the first longitudinal-folding device for nearly completely covering the infeed rollers in operating positions of the first longitudinal-folding device.

2. Safety device according to claim 1, including stationary cover elements with which said movably mounted cover elements on said first longitudinal-folding device are cooperatable.

3. Safety device according to claim 1, wherein said first longitudinal-folding device includes a former plate guidable in a telescopic cover.

4. Safety device according to claim 3, wherein said telescopic cover has a substantially triangular cross section.

5. Safety device according to claim 3, wherein said telescopic cover has a stationary part and a movable part.

6. Safety device according to claim 3, including deflector members disposed adjacent to said telescopic cover.

7. Safety device according to claim 6, wherein said deflector members are disposed above the infeed rollers.

8. Safety device according to claim 6, wherein said deflector members form a funnel-shaped infeed zone.

9. Safety device according to claim 1, wherein said first longitudinal-folding device is mounted on a movable former support.

10. Safety device according to claim 9, wherein said displaceable elements are attached to said former support and are displaceable on guides.

11. Safety device according to claim 10, including a covering element mounted on said displaceable elements and overlapping a front end of said first longitudinal-folding device.

12. Safety device according to claim 10, including a side wall having a stationary cover disposed thereon, said overlapping cover element telescopically overlapping said stationary cover disposed on said side wall.

13. Safety device according to claim 1, including a guide adjacent the infeed rollers, and a drive for moving said first longitudinal-folding device on said guide relative to the infeed rollers.

14. Safety device according to claim 3, including a drive and a connecting member, and wherein said former plate has a former nose, and said cover elements include a displaceable cover in front of said former nose movable by said drive through the intermediary of said connecting member.

15. Safety device according to claim 14, wherein said displaceable cover is constrained to move in accordance with the movement of said first longitudinal-folding device.

16. Safety device according to claim 14, wherein said connecting member is a belt.

17. Safety device according to claim 14, wherein said connecting member is a chain.

* * * * *